(12) United States Patent
Miller et al.

(10) Patent No.: US 8,598,489 B1
(45) Date of Patent: Dec. 3, 2013

(54) COMPACT LASER ETCHING DEVICE, SYSTEM AND METHOD

(76) Inventors: Timothy J. Miller, Winter Park, FL (US); Thomas A. DeRossett, Jr., Atlanta, GA (US)

(*) Notice: Subject to any disclaimer, the term of this patent is extended or adjusted under 35 U.S.C. 154(b) by 380 days.

(21) Appl. No.: 12/861,448

(22) Filed: Aug. 23, 2010

Related U.S. Application Data

(60) Provisional application No. 61/235,863, filed on Aug. 21, 2009.

(51) Int. Cl.
*B23K 26/00* (2006.01)

(52) U.S. Cl.
USPC ............ 219/121.68; 219/121.69; 219/121.72; 219/121.74

(58) Field of Classification Search
USPC ............. 219/121.68, 121.69, 121.72, 121.74, 219/121.66, 121.85
See application file for complete search history.

(56) References Cited

U.S. PATENT DOCUMENTS

| | | | |
|---|---|---|---|
| 4,985,115 A | 1/1991 | De Rossett, Jr. | |
| 5,298,717 A | 3/1994 | DeRossett, Jr. | |
| 2005/0016955 A1* | 1/2005 | DeRossett et al. | ............... 216/65 |

* cited by examiner

*Primary Examiner* — Hsien Ming Lee
(74) *Attorney, Agent, or Firm* — Stites & Harbison PLLC; Jeffrey A. Haeberlin

(57) ABSTRACT

A system, method, and device for etching an indicia onto a piece of glass or other inorganic oxide includes a compact laser etching device having a delivery head, an emitter housing, a RF cable, and a communication cable. The delivery head has a beam steering mechanism and a hood assembly positioned between the beam steering mechanism and the piece of glass. The emitter housing has a laser for generating a laser beam, and a fold mirror positioned in an optical path of the laser beam for redirecting the laser beam into the beam steering mechanism. A remote RF electronics package drives the laser. Control electronics cause the beam steering mechanism to steer the laser beam into a pattern of the indicia. The delivery head may further include a plurality of suction cups for holding the compact laser etching device in engagement with the piece of glass.

10 Claims, 6 Drawing Sheets

COMPACT LASER ETCHING DEVICE, SYSTEM AND METHOD

CROSS-REFERENCE TO RELATED APPLICATIONS

This application claims the benefit of U.S. Provisional Application No. 61/235,863, filed Aug. 21, 2009, the entire disclosure of which is hereby incorporated by reference.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

1. Field of the Invention

Generally speaking, the present invention relates to the field of laser etching. More specifically, an embodiment of the present invention is a compact laser etching device, system, and method with a fixed optical path for etching indicia, such as a Vehicle Identification Numbers (VIN), onto a piece of glass, such as a vehicle window, or other inorganic oxide.

2. Description of Prior Art

FIG. 1 shows a prior-art laser etching system 10. The prior-art system 10 included a large gantry structure 12. A laser 14 was mounted on a motion platform (i.e. trolley) 16 for movement back and forth on the gantry structure 12. An optical arm 18 comprising straight segments connected by mirrored optical joints provided a flexible light path from the laser 14 to a delivery head 20. In use, the delivery head 20 was placed against a glass window 22 of a vehicle 24. An operator stood behind the delivery head 20, held a handle 26 attached to the delivery head 20, and pulled a trigger 28 on the handle 26 to fire the laser 14 and etch the window 22. A laser beam steering system 30 was incorporated into the delivery head 20 to steer the laser beam to create the desired etching pattern. Electronics 32, 34 for driving the laser 14 and the steering system 30 were remotely located from the delivery head 20.

Disadvantages of the prior-art laser etching system 10 include the large mass of the laser 14 and associated systems, alignment and loss issues with the optical arm 18, and the electronics 32, 34 being remote-ed several times. A flexible, and changeable optical path, particularly with the optical arm 18 having many reflective surfaces, causes losses inherent in the design. Thus, to compensate for the losses, the laser 14 was required to be overpowered and heavy.

The laser 14 was typically 20 to 50 watts, and, as mentioned above, was suspended on top the gantry structure 12 and moved back and forth. All of the laser drive electronics were located on the motion platform 16 with the laser 14 and moved with the laser 14 under motorized control. The optical arm 18 was attached to the laser 14 to allow motion of the delivery head 20. The operator handled the delivery head 20 with the assistance of a tool balancer 36 and suspension cable 38, and held the delivery head 20 against a glass window 22 of a vehicle 24. The delivery head 20 had a fair amount of mass, and was mostly subject to damage in the optical alignment. The laser 14 was typically water-cooled.

Another prior-art system, known as a one-knuckle rotation system, is described and shown in U.S. patent application Ser. No. 10/625,783, which is incorporated herein by reference. The one-knuckle rotation system included an emitter housing including a laser, and a marking head joined to the emitter housing by a pivot joint and containing a beam directing apparatus and a lens. In this one-knuckle rotation system, an optical path from the laser to an emission port of the marking head is defined by an alignment mirror in the emitter housing, a through-running passage in a pivot joint, the beam directing apparatus, and the lens. The beam path changed based on the location of the laser relative to the head. The one-knuckle rotation system included integrated RF electronics for driving the laser (e.g., an exemplary integrated RF electronics and 30 watt laser for etching glass had a combined weight of about 16 pounds), contributing to a rather significant weight for the one-knuckle rotation system. Users complained of the one-knuckle rotation system as being too fatiguing, too hard to handle, and creating too much wear on the wrist.

Additionally, in both the prior art laser etching system 10 of FIG. 1, and the one-knuckle rotation system, the systems verified that laser was fixed to a window and ready to mark by the activation of micro switches positioned on the front of the marking head that depressed against the window, sending a signal that the device was ready to mark, or positioned to mark. These micro switches required additional space in the marking head and created additional mechanical failure points.

BRIEF SUMMARY OF THE INVENTION

The present invention addresses the above-mentioned problem and others. One objective of the invention is to provide a compact laser etching system, method, and device having a fixed optical path and a unitary, integral assembly that a user can hold in a single hand, for etching a piece of glass or other inorganic oxide with an indicia.

According to a first aspect of the invention, a system for etching an indicia onto a piece of glass or other inorganic oxide includes a compact laser etching device, an RF electronics package, and control electronics. The compact laser etching device includes a delivery head, an emitter housing, a RF cable, and a communication cable. The delivery head has a beam steering mechanism and a hood assembly positioned between the beam steering mechanism and the piece of glass or other inorganic oxide. The hood assembly has a hood member for holding the beam steering mechanism a fixed distance from the piece of glass or other inorganic oxide. The emitter housing has a laser for generating a laser beam, and a fold mirror positioned in an optical path of the laser beam. The fold mirror is for redirecting the laser beam into the beam steering mechanism. The RF cable is in electrical communication with the laser. The communication cable is in electrical communication with the beam steering mechanism. The RF electronics package is in electrical communication with the RF cable for driving the laser. The RF electronics package is located remote from the compact laser etching device. The control electronics are in electrical communication with the communication cable for causing the beam steering mechanism to steer the laser beam into a pattern of the indicia.

Advantageously, the delivery head and the emitter housing form a unitary, integral assembly having a fixed optical path from the laser to the piece of glass or other inorganic oxide to be etched, thereby minimizing efficiency losses from multiple reflections in the optical path of the laser beam. Further, by locating the RF electronics package remote from the compact laser etching device, the weight of the compact laser etching device is reduced such that the user can hold the compact laser etching device in a single hand.

In an important implementation, the delivery head further includes a plurality of suction cups for holding the compact laser etching device in engagement with the piece of glass or other inorganic oxide, and the compact laser etching device further includes vacuum hoses in flow communication with the plurality of suction cups. This implementation further includes: a vacuum device in flow communication with the vacuum hoses for creating a vacuum in the plurality of suction cups; and vacuum sensors in flow communication with the vacuum hoses for sensing pressures in the vacuum hoses. The control electronics are in electrical communication with vacuum sensors and the vacuum device for controlling a suction level of the vacuum device. Further, the compact laser etching device may include a trigger, wherein the control electronics are in electrical communication with the trigger for: causing the vacuum device to apply a low-level suction to the plurality of suction cups such that the compact laser etching device will loosely stick to the piece of glass or other inorganic oxide; causing the vacuum device to apply a high-level vacuum to the plurality of suction cups to firmly engage the piece of glass or other inorganic oxide, in response to a signal from the trigger; sensing, using the vacuum sensors, a high-level vacuum in the vacuum hoses and substantially no air flow, indicating that the plurality of suction cups are firmly engaged with the piece of glass or other inorganic oxide; and causing the compact laser etching device to etch the indicia onto the piece of glass or other inorganic oxide.

In one implementation, the compact laser etching device further includes an indicator light, wherein the control electronics are further for: causing the indicator light to indicate verification of engagement of the plurality of suction cups and readiness of the compact laser etching device to etch in response to sensing the high-level vacuum in the vacuum hoses indicating that the plurality of suction cups are firmly engaged with the piece of glass or other inorganic oxide, and determining that the trigger is released within a predetermined amount of time before causing the compact laser etching device to etch the indicia onto the piece of glass or other inorganic oxide.

In another implementation, the control electronics are further for causing the vacuum device to return to applying a low-level suction without causing the compact laser etching device to etch the indicia onto the piece of glass or other inorganic oxide, in response to determining that the trigger has not been released within a predetermined amount of time, so that the laser etching device can be repositioned.

In yet another implementation, the control electronics are further for: causing the vacuum device to apply a positive pressure to the vacuum hoses following etching the indicia onto the piece of glass or other inorganic oxide, in order to break a seal with the piece of glass or other inorganic oxide and clean out the vacuum hoses and the plurality of suction cups; and sensing, using the vacuum sensors, substantially no vacuum or pressure in the vacuum hoses, indicating that the vacuum hoses and the plurality of suction cups are clear and unclogged.

According to another aspect of the invention, a method for etching an indicia onto a piece of glass or other inorganic oxide includes the steps of: causing a vacuum device to apply a low-level suction to suction cups of a compact laser etching device such that the compact laser etching device will loosely stick to the piece of glass or other inorganic oxide; causing the vacuum device to apply a high-level vacuum to the suction cups to firmly engage the piece of glass or other inorganic oxide, in response to a signal from a trigger of the compact laser etching device; sensing, using vacuum sensors in flow communication with the suction cups, a high-level vacuum in the suction cups, indicating that the suction cups are firmly engaged with the piece of glass or other inorganic oxide; and causing the compact laser etching device to etch the indicia onto the piece of glass or other inorganic oxide.

The method may further include the steps of: causing an indicator light of the compact laser etching device to indicate verification of engagement of the suction cups and readiness of the compact laser etching device to etch in response to sensing the high-level vacuum in the suction cups, indicating that the suction cups are firmly engaged with the piece of glass or other inorganic oxide, and determining that the trigger is released within a predetermined amount of time before causing the compact laser etching device to etch the indicia onto the piece of glass or other inorganic oxide.

In another implementation, the method may further include causing the vacuum device to return to applying a low-level suction without causing the compact laser etching device to etch the indicia onto the piece of glass or other inorganic oxide, in response to determining that the trigger has not been released within a predetermined amount of time, so that the laser etching device can be repositioned.

In yet another implementation, the method further includes the steps of: causing the vacuum device to apply a positive pressure to the suction cups following etching the indicia onto the piece of glass or other inorganic oxide, in order to break a seal with the piece of glass or other inorganic oxide and clean out the suction cups; and sensing, using the vacuum sensors, substantially no vacuum or pressure in the suction cups, indicating that the suction cups are clear and unclogged.

According to another aspect of the invention, a compact laser etching device for etching an indicia onto a piece of glass or other inorganic oxide material, includes a delivery head and an emitter housing. The delivery head includes: a beam steering mechanism having an input aperture for receiving a laser beam, a means for steering the laser beam into a pattern of the indicia, and an output window for outputting the laser beam; and a hood assembly positioned between the beam steering mechanism and the piece of glass, the hood assembly having a hood member for holding the beam steering mechanism a fixed distance from the piece of glass, and a plurality of suction cups for connection to a vacuum device for holding the compact laser etching device in engagement with the piece of glass. The emitter housing includes: a laser for generating the laser beam; and a fold mirror positioned in an optical path of the laser beam, the fold mirror for redirecting the laser beam into the beam steering mechanism.

Advantageously, the optical path from the laser to the piece of glass is fixed, the laser beam etches the piece of glass or other inorganic oxide with the indicia, and the delivery head and the emitter housing are a unitary, integral assembly that a user can hold in a single hand.

In one implementation, the compact laser etching device further includes a focusing lens positioned adjacent to the beam steering mechanism for focusing the laser beam output from the beam steering mechanism onto the piece of glass.

The compact laser etching device may also include a shutter positioned adjacent to the laser and in the optical path of the laser beam. The shutter is for opening and closing in order to control passage of the laser beam.

The compact laser etching device may also include a collimator positioned in the optical path of the laser beam, the collimator for collimating the laser beam;

Other features and advantages of the invention will be set forth in or apparent from the detailed description of the exemplary embodiments of the invention found below.

DETAIL DESCRIPTION OF EXEMPLARY EMBODIMENTS OF THE INVENTION

An improved laser etching system, described below, has the following features: a laser and a delivery head are integrated into a unitary device. The laser is much smaller and much lighter than the lasers of prior devices and systems. There is no optical arm, and no flexure in the optical delivery path from the laser to the delivery head. Thus, the relation of the laser and the delivery head is rigid, without any rotating knuckles containing optical joints.

Figure 2:
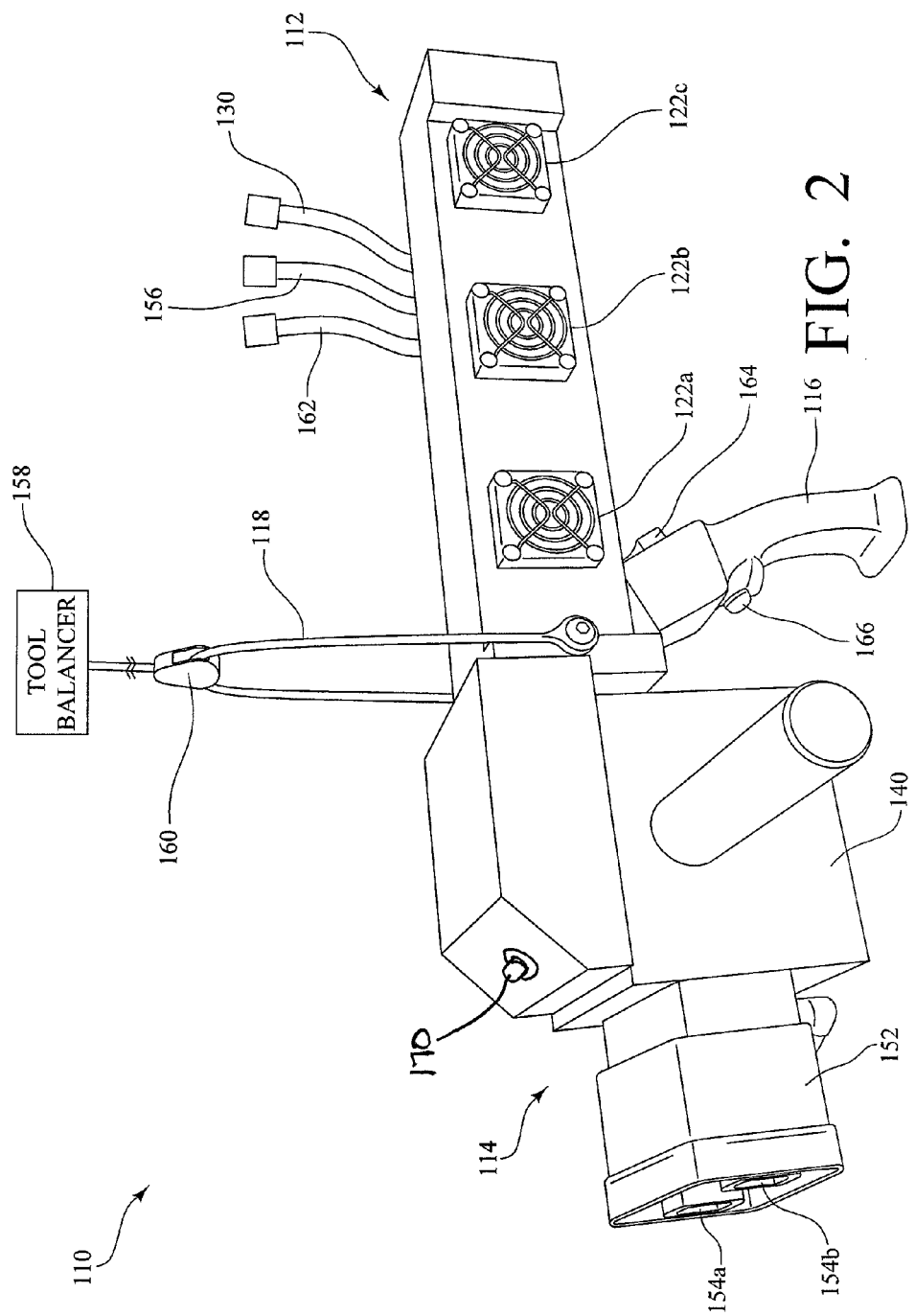
FIG. 2 is a perspective view of an exemplary compact laser etching device according to the invention.
Figure 3:
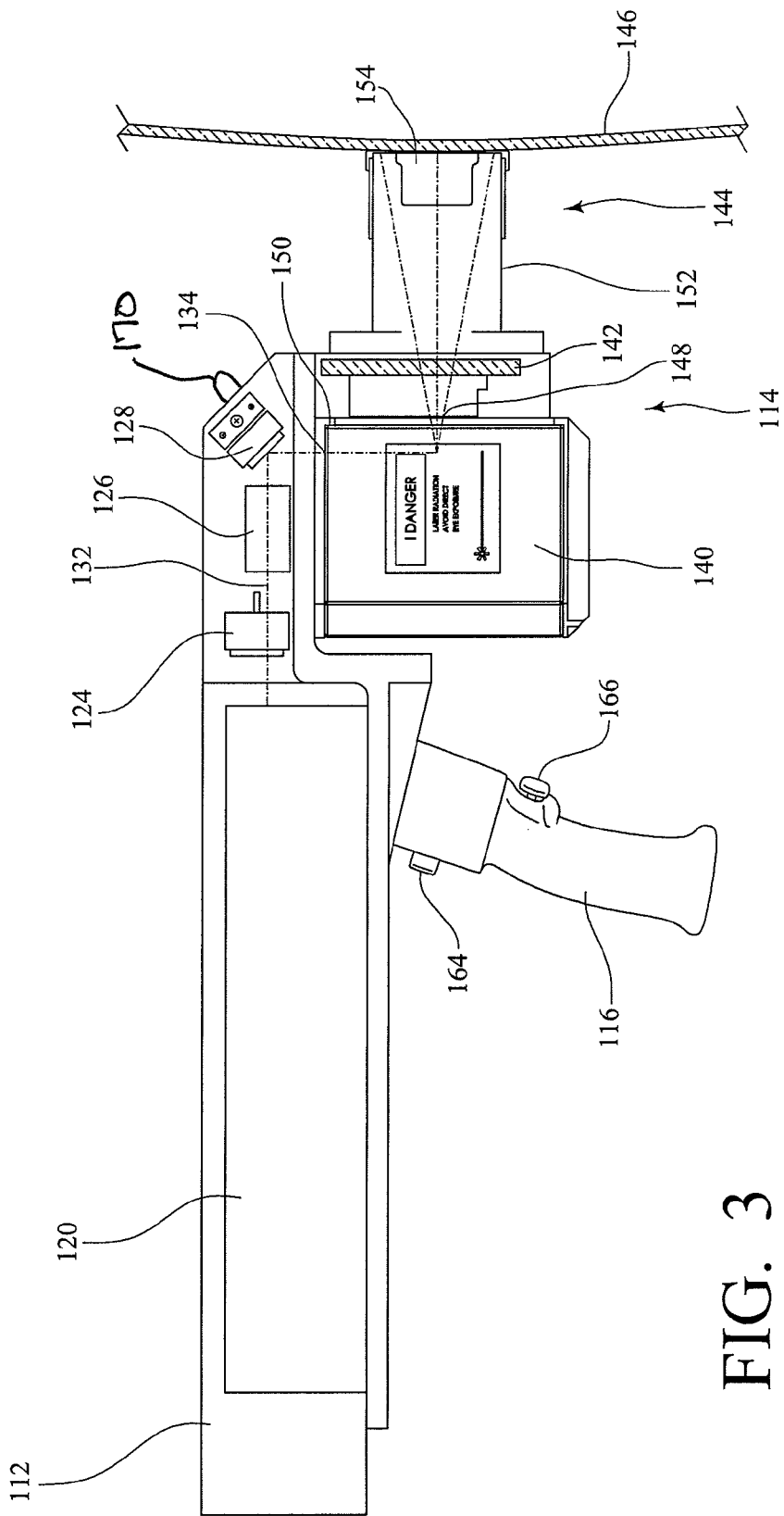
FIG. 3 is a side view of the exemplary compact laser etching device of FIG. 2 with selected portions cut away, and showing the exemplary compact laser etching device attached to a piece of glass.
Figure 4:
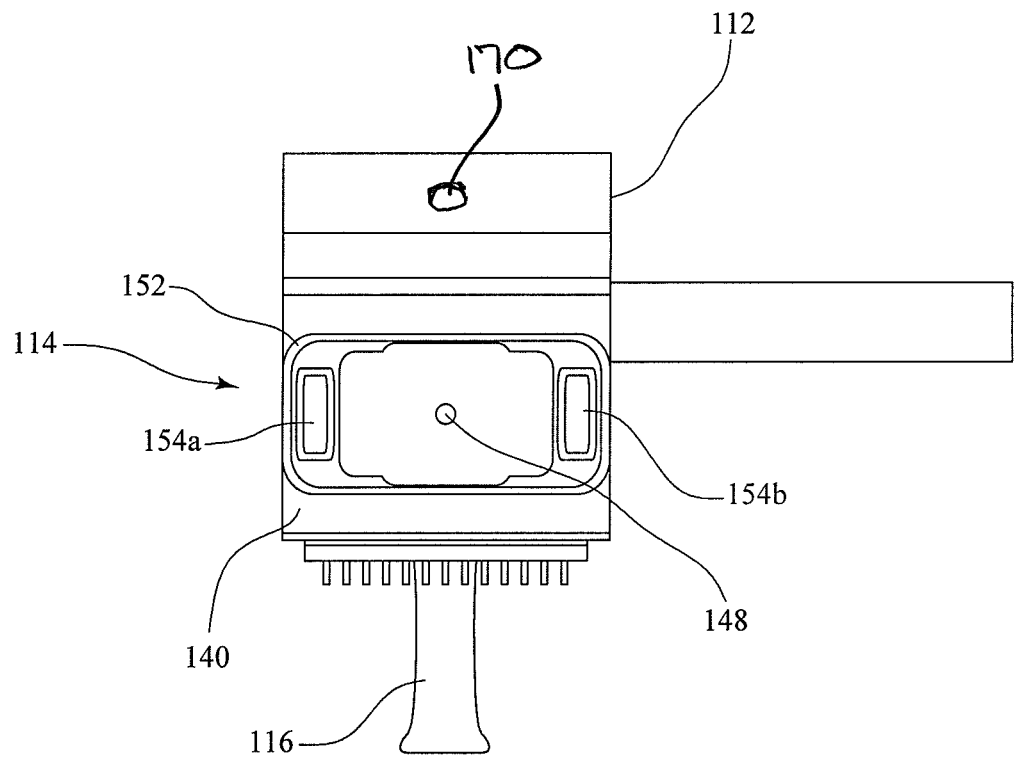
FIG. 4 is a front view of the exemplary compact laser etching device of FIG. 2.

FIG. 2-FIG. 4 show an exemplary embodiment of a compact laser etching device 110, incorporating the above-described features and including: an emitter housing 112 and an integral delivery head 114. A trigger handle 116 and a cable loop 118 are attached to the compact laser etching device 110.

Figure 5:
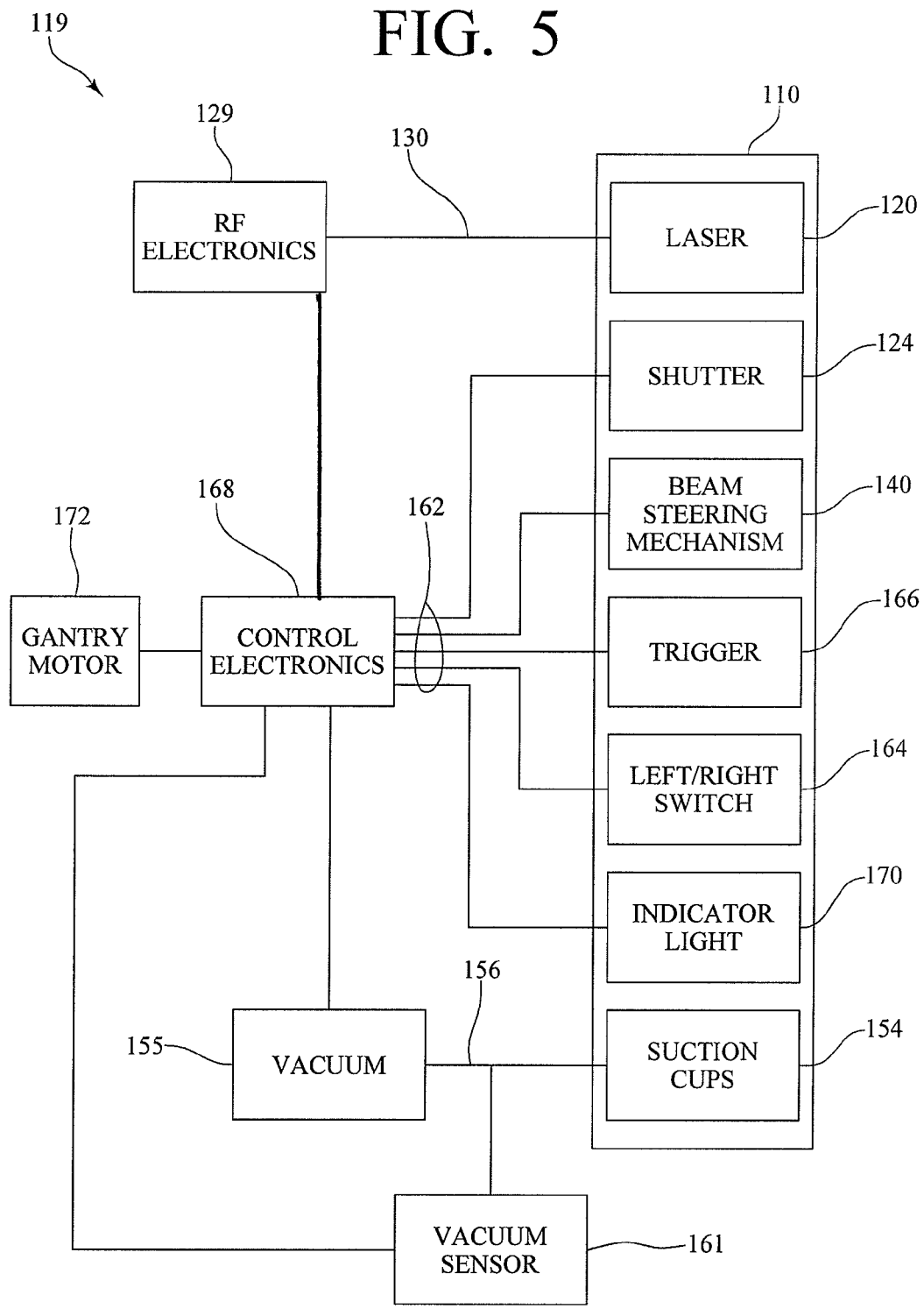
FIG. 5 is a functional block diagram of an exemplary compact laser etching system according to the invention.

FIG. 5 is a functional block diagram of the components of a laser etching system 119 including the compact laser etching device 110 of FIG. 2-FIG. 4.

The following description will refer to FIG. 2-FIG. 5.

The emitter housing 112 houses a laser 120, fans 122a, 122b, 122c and corresponding vents (not visible), a shutter 124, a collimator 126, and a fold mirror 128.

In an exemplary embodiment, the laser 120 is compact in size (e.g., 305 mm×105 mm×64 mm), light in weight (e.g., about five pounds, including fans, with an RF electronics package 129 (FIG. 5) being located remotely from the laser 120), and powerful enough to perform etching of glass (e.g., about 30 watts peak power) or other inorganic oxide. The exemplary laser 120 has a super pulsing mode (i.e., driving the laser harder for shorter periods (lower duty cycles) of time than its normal continuous wave ("CW") power). Preferably, the laser 120 delivers about 30 watts of peak power. Utilizing the exemplary laser 120 having a super pulsing mode allows the laser 120 to have a size equivalent to a smaller, lower powered CW mode laser while still having adequate peak power for etching of glass, ceramics, and other inorganic oxides. A $CO_2$ laser is preferred for etching glass, while a YAG laser is preferred for etching other materials, such as metals.

The specification will refer to the etching of a piece of glass, but it should be understood that the device, system, and method of the invention is not limited to the etching of a piece of glass, but is applicable to the etching of any inorganic oxide.

Figure 1:
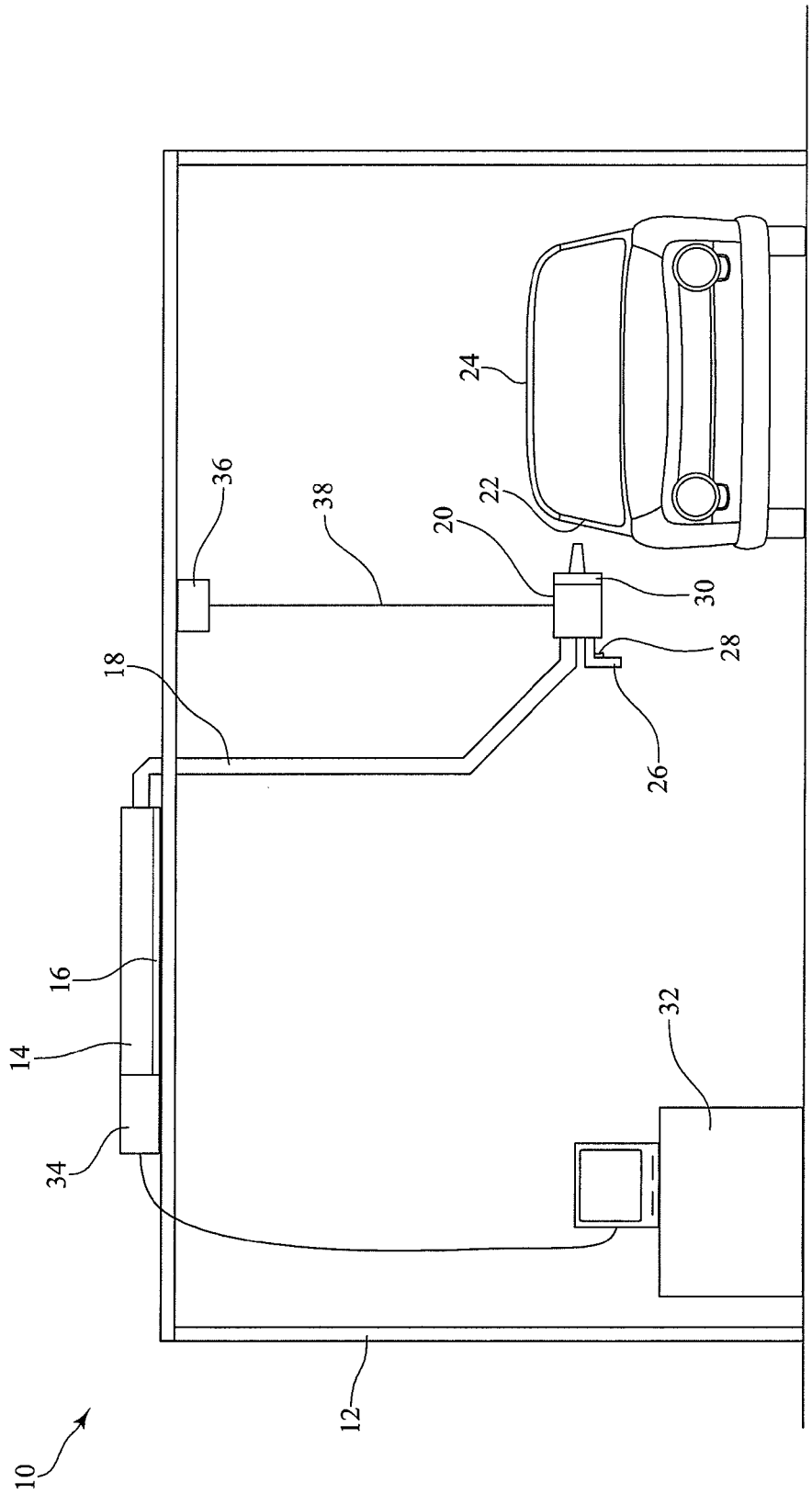
FIG. 1 is a view of a prior art laser etching system.

The RF electronics package 129 (FIG. 5) is preferably located remotely from the laser to reduce the weight and size of the compact laser etching device 110. For example, the RF electronics package 129 may be located on a gantry structure, similar to the gantry structure 12 of FIG. 1, such that RF energy for driving the laser 120 can be delivered via a RF cable 130 (FIG. 5) to the laser 120. The RF electronics package 129 may, for example, weigh about four pounds. The RF cable 130 connecting the RF electronics package 129 to the laser 120 may, for example, be a coaxial cable of about eight feet in length. Advantageously, reducing the weight of the compact laser etching device 110 reduces user fatigue from using the compact laser etching device 110.

The fans 122a, 122b, 122c and corresponding vents (not visible) provide air-cooling of the laser 120.

In the optical train, the laser 120 generates a laser beam 132 that exits the laser 120, passes through the shutter 124, is re-collimated by the collimator 126, and is folded by the fold mirror 128 into the delivery head 114. The fold mirror 128 is a steering mirror that folds the laser beam 132 straight down into an input aperture 134 on the delivery head 114.

The delivery head 114 includes a beam steering mechanism 140 (i.e., a scan head), a focusing lens 142, and a hood assembly 144. The beam steering mechanism 140 steers the laser beam 132 to a piece of glass 146 to be etched. The beam steering mechanism 140 is mounted in the device 110 in an orientation wherein an output window 148 faces forward toward the focusing lens 142. The input aperture 134 is located on a top wall 150 of the beam steering mechanism 140, in a strictly vertical orientation when the longitudinal axis of the device 110 is in a horizontal orientation. The laser beam 132 enters the input aperture 134, and then is directed by a means for steering the laser beam 132 into a pattern of an indicia to be etched into the piece of glass 146. The laser beam 132 exits via the output window 148.

One example of a means for steering the laser beam 132 into the pattern of the indicia are beam steering mirrors (not shown) mounted on galvanometric motors (not shown). Other beam steering technologies, such as piezo-electric and acousto-optical, provide equivalent beam steering functionality and are within the spirit and scope of the invention described herein.

In its adaptation to the device 110, the beam steering mechanism 140 is positioned between the laser 120 and the focusing lens 142. Electronics that operate the servos (not shown) of the beam steering mechanism 140 are integral to the beam steering mechanism 140. This is allowed a reduction in the electronics size as compared to prior-art laser etching devices. Thus, remote electronics are much less than in prior systems because of incorporation of the electronics inside the beam steering mechanism 140 itself. Advantageously, this reduces maintenance without adding weight.

As the laser beam 132 exits the output window 148 it is not focused. At this point, the laser beam 132 is just collimated or parallel light. The focusing lens 142 is an f-theta lens, which takes the collimated light and focuses it to its final spot size onto the piece of glass 146 (i.e. a flat surface on a flat plane so that the reference to where the light is focused is a flat surface). The focusing lens 142 is made of either zinc or germanium, and is held to the beam steering mechanism 140 by an adapter.

The hood assembly 144 includes a hood member 152 and a plurality of suction cups 154a, 154b. The hood member 152 holds the beam steering mechanism 140 and the focusing lens 142 a fixed distance from the piece of glass 146 such that the laser beam 132 is optimally focused for etching the piece of glass 146. The hood member also, for safety reasons, encompasses the optical path from the beam steering mechanism 140 to the piece of glass 146 such that the laser beam 132 cannot accidentally escape and foreign objects cannot accidentally be positioned in the optical path.

A vacuum device 155 (FIG. 5) is preferably located remotely from the laser etching device 110, for example, on a fixed part of a gantry structure, and is connected to the laser etching device 110 through vacuum hoses 156 (FIG. 2). When in contact with the piece of glass 146, the suction cups 154*a*, 154*b* draw the glass 146 in to create a seal, as described in more detail below. In an exemplary embodiment, the vacuum device 155 includes a vacuum pump and independent electronically operated valves for each of the suction cups 154*a*, 154*b*. The valves control the amount of air bled into the vacuum hoses 156 to control the suction level at the suction cups 154*a*, 154*b*, as also described in more detail below.

Advantageously, the exemplary compact laser etching device 110 greatly reduces loss through the optical train. The distance from the laser 120 to the piece of glass 146 is fixed, and there are reduced losses on major surfaces, such as going from mirror to mirror to mirror in the optical arm 18 of the prior-art system 10 (FIG. 1), where losses are typically experienced. Most of the energy of the laser beam 132 is delivered to the piece of glass 146.

The laser etching device 110 is designed to hang from a single tool balancer 158. Thus, the laser etching device 110 is typically at zero gravity when operated by a user. Various utility connections 130, 156, 162 are also suspended from the rear of the laser etching device 110 to a gantry structure (similar to the gantry structure 12 shown in FIG. 1), and, when suspended, allow the device 110 to hang with its longitudinal axis substantially horizontally. The cable loop 118 acts as a suspension assembly and is positioned through a center of gravity of the laser etching device 110. The tool balancer 158 biases the laser etching device 110 upward with a force equal to the weight of the laser etching device, such that the laser etching device 110 is essentially held at zero gravity. Thus, the laser etching device 110 may be moved in any direction with very little effort, substantially reducing user fatigue.

A single tool balancer 158 can be used to suspend the device 110 so that it is usable and non-fatiguing, including: the cable loop 118 and a pulley 160 attached to tool balancer 158. The pulley 160 has motion in two directions and clamps down at the center of gravity of the device 110. All of the suspension rotates about that point. It provides the appearance that the device 110 is sitting level and even in space. However, just grabbing the handle allows the device 110 to rotate. Advantageously, a user can hold the entire laser etching device 110 with one hand.

A further advantage of the exemplary laser etching device 110 is that if a problem occurs with the laser etching device 110, the utility cables 130, 156, 162 can be disconnected and a backup unit installed in its place. There is no component level troubleshooting with the laser etching device 110.

The laser etching system 119 also includes vacuum sensors 161 (FIG. 5) for sensing the pressure in the vacuum hoses 156, for sensing a seal to the piece of glass 146 without the mechanical micro switches of the prior art. If the suction cups 154*a*, 154*b* are fully engaged, there will be a variance in the pressure in the vacuum hoses 156. The variation in the pressure is sufficient to signal that the position is correct. Thus, the suction cups 154*a*, 154*b* are on independent vacuum sense.

As shown in FIG. 5, the exemplary system 119 includes control electronics 168 for operating the components of the system, including the shutter 124, the beam steering mechanism 140, the suction cups 154*a*, 154*b*, vacuum device 155, indicator light 170, and a gantry motor 172, in response to receiving input from the vacuum sensors 161, a trigger 166, and a left-right switch 164, as described in more detail below.

In an exemplary embodiment, the control electronics 168 comprise a microprocessor operably coupled to a memory component (or components) and an input/output (I/O) component (or components). The memory component stores non-transitory computer executable instructions (i.e., software) for causing to microprocessor, the I/O component, and the other elements of the exemplary system 119 to operate in the manner described below.

Figure 6:
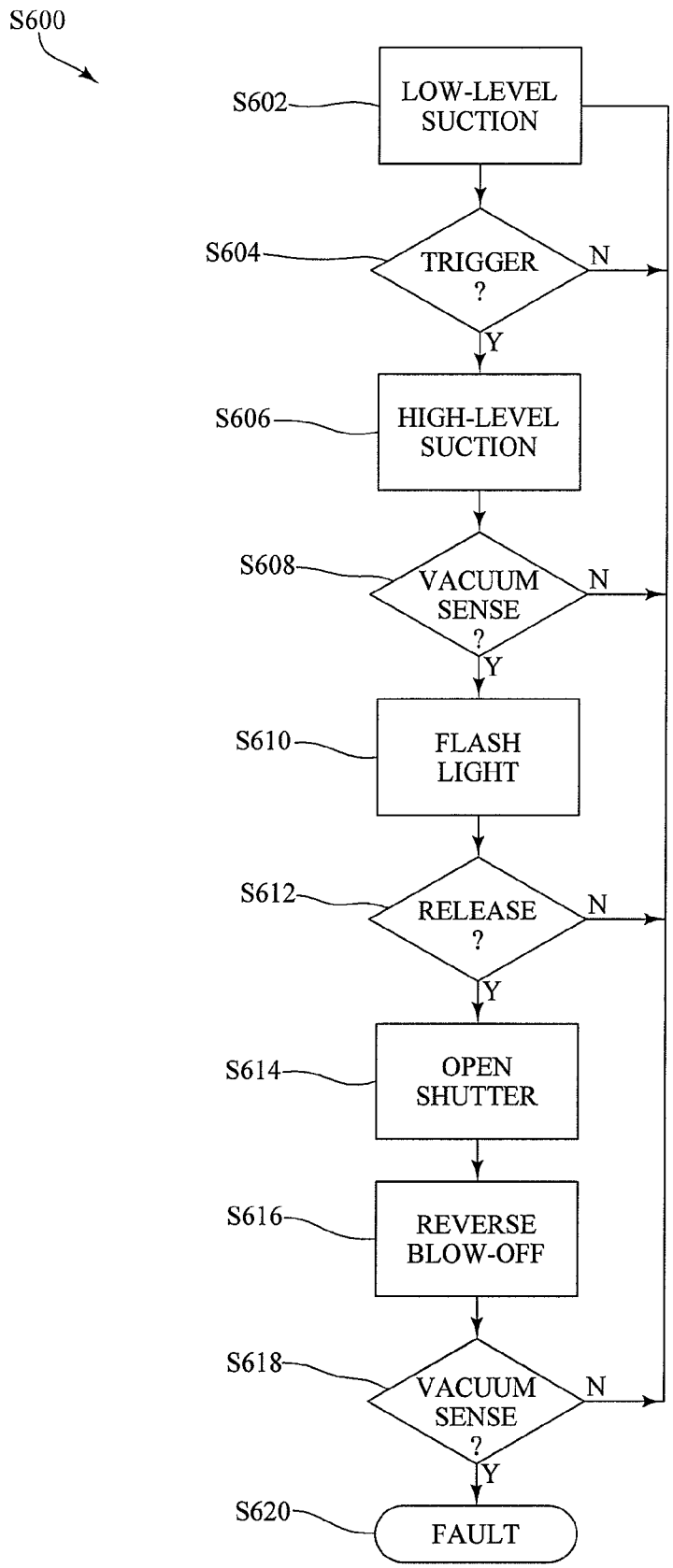
FIG. 6 is a flow diagram of an exemplary compact laser etching method according to the invention.

FIG. 6 is a flow chart of an exemplary method S600 of operating the laser etching system 119 of FIG. 5.

In a first step, S602, the control electronics 168 cause a low-level suction to be applied to the suction cups 154*a*, 154*b* by the vacuum device 155, for example, by controlling valves that control an amount of air (in this event a greater amount of air) bled into the vacuum hoses 156 connecting a vacuum pump to the suction cups 154*a*, 154*b*. The laser etching device 110 is very tactile. If a user moves it to a piece of glass 146, it sticks there loosely. If the user moves it around on the glass 146, it has a little bit of a sticky effect, because the suction cups 154*a*, 154*b* have a very low level vacuum (but not that prevents movement).

In the next step, S604, the control electronics 168 monitor a trigger 166 on the trigger handle 116. When the laser etching device 110 is positioned in a desired location, the user pulls the trigger 166.

In step S606, the control electronics 168 cause the vacuum device 155 to apply a high-level vacuum to the suction cups 154*a*, 154*b*, for example, by again controlling valves that control an amount of air (in this event a lesser amount of air) bled into the vacuum hoses 156 connecting a vacuum pump to the suction cups 154*a*, 154*b*.

In step S608, the control electronics 168 determine if both suction cups 154*a*, 154*b* are engaged using signals from the vacuum sensors 161, to thereby ensure that the piece of glass 146 is in front of the laser etching device 110. For instance, if the suction cups 154*a*, 154*b* are firmly engaged with the piece of glass 146, the vacuum sensors 161 will indicate a high-level vacuum in the vacuum hoses 156 and substantially no air flow. Advantageously, by removing the mechanical micro switches of the prior art, and using the vacuum sensors 161, the laser etching device 110 is lightened. If the control electronics 168 do not verify engagement of the suction cups 154*a*, 154*b* in a predetermined time, the control electronics 168 will cause the vacuum device 155 to return to step S602, applying a low-level suction.

If the control electronics 168 verify engagement of the suction cups 154*a*, 154*b*, in step S610, the control electronics 168 send a signal via the communication cable 162 to flash an indicator light 170. Flashing of the indicator light 170 indicates verification of engagement of the suction cups 154*a*, 154*b* and readiness of the system 119 proceed with etching. Accordingly, the control electronics 168 perform a safety function of ensuring that the laser etching device is secured to the piece of glass 146 before proceeding with etching.

In step S612, the control electronics 168 determine if the trigger 166 is released within a predetermined amount of time (e.g., three seconds). If the trigger 166 is not released within the predetermined amount of time, the vacuum device 155 will return to step S602, applying a low-level suction so that the laser etching device 110 can be repositioned by the user as desired. Thus, if the user has accidentally pulled the trigger 166 or has decided to no longer proceed with etching, the control electronics 168 will cause the vacuum device 155 to release the high-level vacuum and return to the low level suction if the user merely continues to pull the trigger 166 without releasing it. Once the vacuum device 155 returns to the low level suction, the user can release the trigger 166 and reposition the laser etching device 110 as desired.

However, if the control electronics 168 determine that the trigger has been released within the predetermined amount of time, in step S614, the control electronics 168 will cause the shutter 124 to be opened and the laser 120 to fire on the piece of glass 146.

In step S616, the control electronics 168 cause the vacuum device 155 to perform a "reverse blow-off" on the suction cups 154*a*, 154*b*, wherein the vacuum device 155 reverses to apply a positive pressure to the vacuum hoses 156 which breaks the seal with the glass 146 and cleans out the vacuum hoses 156 and the suction cups 154*a*, 154*b*. The control electronics 168 then cause the vacuum device 155 to switch back to vacuum operation.

In step S618, the control electronics 168 use the vacuum sensors 161 to verify that the vacuum hoses 156 and the suction cups 154*a*, 154*b* are clear and unclogged. For instance, if the vacuum hoses 156 and the suction cups 154*a*, 154*b* are clear and unclogged, the vacuum sensors 161 will indicate substantially no vacuum or pressure in the vacuum hoses 156. If the control electronics determine that the vacuum hoses 156 and the suction cups 154*a*, 154*b* are clear and unclogged, the control electronics 168 cause the vacuum device 155 to return to step S602, applying a low-level suction.

If the control electronics 168 determine that the vacuum hoses 156 and the suction cups 154*a*, 154*b* are clogged, then in step S620 the control electronics 168 determine that a fault condition has occurred and cause the laser etching system 119 to shut down.

Additionally, the trigger handle 116 has a left-right switch 164. The laser etching device 110 is attached to a moving gantry, similar to the gantry structure 12 of FIG. 1. In most implementations, a gantry motor 172 (FIG. 5) will move the tool balancer 158 in a motion around the car. The left-right switch 164 moves the laser etching device 110 in one direction or another direction along the length of a car. Thus, the user is able to walk around to the other side of the car and use the left-right switch 164 to move the device toward the front or the back of the car.

The following components are remote from the laser etching device 110: vacuum sensors 161, vacuum device 155, RF electronics 129, and the control electronics 168. The control electronics 168 coordinate an operator interface, the vacuum sensors 161/vacuum device 155, and the RF electronics 129, and communicate with the laser etching device 110 via the communication cable 162 to control the beam steering mechanism 140, receive the signal from the trigger 166 and left-right switch 164, and control the shutter 124 for the laser 120 to fire the laser etching device 110.

In an exemplary embodiment, the system 119 will load an indicia to be etched in to the piece of glass 146, such as a vehicle identification number (VIN), through the operator interface via a bar code reader, a keyboard, or a touch screen, and the control electronics 168 will cause the beam steering mechanism 140 to steer the laser beam 132 into a pattern of the indicia.

One of ordinary skill in the art will recognize that additional steps and configurations are possible without departing from the teachings of the invention. This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention.

What is claimed is:

1. A system for etching an indicia onto a piece of glass, the system comprising:
    a compact laser etching device comprising:
        a delivery head having a beam steering mechanism, and a hood assembly positioned between the beam steering mechanism and the piece of glass, the hood assembly having a hood member for holding the beam steering mechanism a fixed distance from the piece of glass;
        an emitter housing having a laser for generating a laser beam, and a fold mirror positioned in an optical path of the laser beam, the fold mirror for redirecting the laser beam into the beam steering mechanism;
        a RF cable in electrical communication with the laser; and
        a communication cable in electrical communication with the beam steering mechanism;
    an RF electronics package in electrical communication with the RF cable for driving the laser, the RF electronics package located remote from the compact laser etching device;
    control electronics in electrical communication with the communication cable for causing the beam steering mechanism to steer the laser beam into a pattern of the indicia.

2. The system of claim 1,
    wherein said delivery head further comprises a plurality of suction cups for holding the compact laser etching device in engagement with the piece of glass;
    wherein said compact laser etching device further comprises vacuum hoses in flow communication with the plurality of suction cups;
    further comprising:
        a vacuum device in flow communication with the vacuum hoses for creating a vacuum in the plurality of suction cups; and
        vacuum sensors in flow communication with the vacuum hoses for sensing pressures in the vacuum hoses;
    wherein the control electronics are in electrical communication with vacuum sensors and the vacuum device for controlling a suction level of the vacuum device.

3. The system of claim 2,
    wherein the compact laser etching device further comprises a trigger;
    wherein the control electronics are in electrical communication with the trigger for:
        causing the vacuum device to apply a low-level suction to the plurality of suction cups such that the compact laser etching device will loosely stick to the piece of glass;
        causing the vacuum device to apply a high-level vacuum to the plurality of suction cups to firmly engage the piece of glass, in response to a signal from the trigger, wherein a vacuum level of the high-level vacuum is greater than a vacuum level of the low-level suction;
        sensing, using the vacuum sensors, a high-level vacuum in the vacuum hoses and substantially no air flow, indicating that the plurality of suction cups are firmly engaged with the piece of glass; and
        causing the compact laser etching device to etch the indicia onto the piece of glass.

4. The system of claim 3,
wherein the compact laser etching device further comprises an indicator light,
wherein the control electronics are further for:
  causing the indicator light to indicate verification of engagement of the plurality of suction cups and readiness of the compact laser etching device to etch in response to sensing the high-level vacuum in the vacuum hoses indicating that the plurality of suction cups are firmly engaged with the piece of glass, and
  determining that the trigger is released within a predetermined amount of time before causing the compact laser etching device to etch the indicia onto the piece of glass.

5. The system of claim 3, wherein the control electronics are further for causing the vacuum device to return to applying a low-level suction without causing the compact laser etching device to etch the indicia onto the piece of glass, in response to determining that the trigger has not been released within a predetermined amount of time, so that the laser etching device can be repositioned.

6. The system of claim 3, wherein the control electronics are further for:
  causing the vacuum device to apply a positive pressure to the vacuum hoses following etching the indicia onto the piece of glass, in order to break a seal with the piece of glass and clean out the vacuum hoses and the plurality of suction cups; and
  sensing, using the vacuum sensors, substantially no vacuum or pressure in the vacuum hoses, indicating that the vacuum hoses and the plurality of suction cups are clear and unclogged.

7. A method for etching an indicia onto a piece of glass, the method comprising:
  causing a vacuum device to apply a low-level suction to suction cups of a compact laser etching device such that the compact laser etching device will loosely stick to the piece of glass;
  causing the vacuum device to apply a high-level vacuum to the suction cups to firmly engage the piece of glass, in response to a signal from a trigger of the compact laser etching device, wherein a vacuum level of the high-level vacuum is greater than a vacuum level of the low-level suction;
  sensing, using vacuum sensors in flow communication with the suction cups, a high-level vacuum in the suction cups, indicating that the suction cups are firmly engaged with the piece of glass; and
  causing the compact laser etching device to etch the indicia onto the piece of glass.

8. The method of claim 7, further comprising:
  causing an indicator light of the compact laser etching device to indicate verification of engagement of the suction cups and readiness of the compact laser etching device to etch in response to sensing the high-level vacuum in the suction cups, indicating that the suction cups are firmly engaged with the piece of glass, and
  determining that the trigger is released within a predetermined amount of time before causing the compact laser etching device to etch the indicia onto the piece of glass.

9. The method of claim 7, further comprising causing the vacuum device to return to applying a low-level suction without causing the compact laser etching device to etch the indicia onto the piece of glass, in response to determining that the trigger has not been released within a predetermined amount of time, so that the laser etching device can be repositioned.

10. The method of claim 7, further comprising:
  causing the vacuum device to apply a positive pressure to the suction cups following etching the indicia onto the piece of glass, in order to break a seal with the piece of glass and clean out the suction cups; and
  sensing, using the vacuum sensors, substantially no vacuum or pressure in the suction cups, indicating that the suction cups are clear and unclogged.

* * * * *